United States Patent
Mukawa

[11] Patent Number: 5,804,268
[45] Date of Patent: Sep. 8, 1998

[54] PLASTIC HOLLOW MEMBER

[75] Inventor: Tatsuhiko Mukawa, Higashi-Kurume, Japan

[73] Assignee: Fuji Jukogyo Kabushiki Kaisha, Tokyo, Japan

[21] Appl. No.: 804,518

[22] Filed: Feb. 21, 1997

Related U.S. Application Data

[60] Continuation-in-part of Ser. No. 456,832, Jun. 1, 1995, abandoned, which is a division of Ser. No. 412,340, Mar. 31, 1995, Pat. No. 5,693,284, which is a continuation-in-part of Ser. No. 53,706, Apr. 29, 1993, abandoned.

[30]  Foreign Application Priority Data

Jun. 10, 1992   [JP]   Japan  .................................... 4-175062

[51] Int. Cl.$^6$ ..................................................... B32B 1/08
[52] U.S. Cl. ..................... 428/36.4; 428/35.9; 428/36.9; 428/36.91
[58] Field of Search ................... 428/35.7, 35.9, 428/36.4, 36.9, 36.91

[56] References Cited

U.S. PATENT DOCUMENTS

| | | | |
|---|---|---|---|
| 3,091,000 | 5/1963 | Makowski | 264/513 |
| 4,940,270 | 7/1990 | Yamazaki et al. | 293/122 |
| 5,013,515 | 5/1991 | Aoki | 264/513 |
| 5,035,983 | 7/1991 | Kiyonari et al. | 430/346 |
| 5,169,590 | 12/1992 | Johnson et al. | 264/506 |
| 5,194,212 | 3/1993 | Bonnett | 264/513 |
| 5,330,810 | 7/1994 | Nishino | 428/36.91 |

FOREIGN PATENT DOCUMENTS 405138796   6/1993   Japan .

*Primary Examiner*—D. S. Nakarani
*Attorney, Agent, or Firm*—Beveridge, DeGrandi, Weilacher & Young, L.L.P.

[57]  ABSTRACT

A hollow plastic member is disclosed suitable for the intake passageway for an automobile engine. A core member is provided formed of multiple layers by blow molding. The outer layer is formed around the core member by injection molding.

4 Claims, 2 Drawing Sheets

PLASTIC HOLLOW MEMBER

REFERENCE TO A RELATED APPLICATION

This is a continuation-in-part of my application Ser. No. 08/456,832 filed Jun. 1, 1995, now abandoned, which in turn is a division of my application Ser. No. 08/412,340, filed Mar. 31, 1995, U.S. Pat. No. 5,693,284, which in turn is a continuation in part of my application Ser. No. 08/053,706 filed Apr. 29, 1993, now abandoned, all of which are relied on and incorporated herein by reference.

INTRODUCTION AND BACKGROUND OF THE INVENTION

The present invention relates to a plastic hollow member and its use in vehicles such as automobiles, and more particularly to a tubular member used for guiding fluids, such as air, to the appropriate location.

In recent years there has been a tendency for various plastics to be widely used as the material for manufacturing parts for automotive vehicles.

For instance, it is known to make the air inlet pipe of the engine by plastic molding.

A hollow plastic member is integrally formed by injection molding around a core member that comprises a hollow inside member with a solid such as sand or glass pieces inserted therein to prevent deformation or transformation at the time of injection molding; see Japanese Patent Application laid-open Nos. 63-111031 and 63-141713. However, this type of hollow plastic member is limited to two kinds of plastic material because the two-layered structure includes an inside and an outside hollow member. With such structures it is difficult for the hollow plastic member to satisfy requirements for a high degree of smoothness on the inside of the conduit while at the same time possessing sufficient strength and gas-barrier properties.

An object of the present invention is to provide a hollow plastic member which overcomes problems encountered in the past. A further object of the invention is to provide a hollow plastic member having a smooth inside surface to essentially avoid friction when fluids pass through it, as well as having sufficient strength and gas-barrier properties.

SUMMARY OF THE INVENTION

In order to achieve the above-described and other objects of the invention, one feature of the invention resides in a hollow plastic member, having as a core member, an inner hollow member formed of multiple layers by blow molding, and further, having an outer hollow plastic member integrally formed by injection molding around the core member, to provide a multi-layer plastic hollow member.

In order to achieve the plastic hollow member of the invention, a two step method is employed to produce the hollow plastic member which comprises, first forming an inner hollow member with a plurality of resin layers according to blow molding techniques as a core member, and thereafter in a second step injecting plastic resin around the inner hollow member according to injection molding techniques to provide the desired integral hollow member.

In order to further achieve the above-mentioned objects, the present invention produces the hollow plastic member by forming an inner hollow core member from (1) a non-reinforced resin layer as the inside surface of the inner hollow case member and (2) a reinforced resin layer as the outside surface of the inner hollow core member in accordance with blow molding techniques, so as to provide the desired characteristics of smoothness of the inner surface, sufficient strength, and higher gas-barrier properties.

The inner hollow core member formed from (1) and (2) above has sufficient structural strength so that in the injection molding step according to the invention which then follows it is not necessary to fill the inner hollow core member with a solid material such as sand or glass pieces. Thus, the deformation or transformation of the hollow plastic member at the injection molding step is prevented.

The hollow plastic member formed by the present invention is a multi layer structure with three or more layers and possesses a smooth inside surface and is of satisfactory strength with a higher gas barrier characteristics compared to other plastic members known in the art.

These and other objects and features of the present invention will become apparent to those skilled in the art from the following description together with the accompanying drawings.

DETAILED DESCRIPTION OF THE PREFERRED EMBODIMENT

The preferred embodiment of the present invention is explained in further detail with reference to the accompanying drawings.

Figure 1:
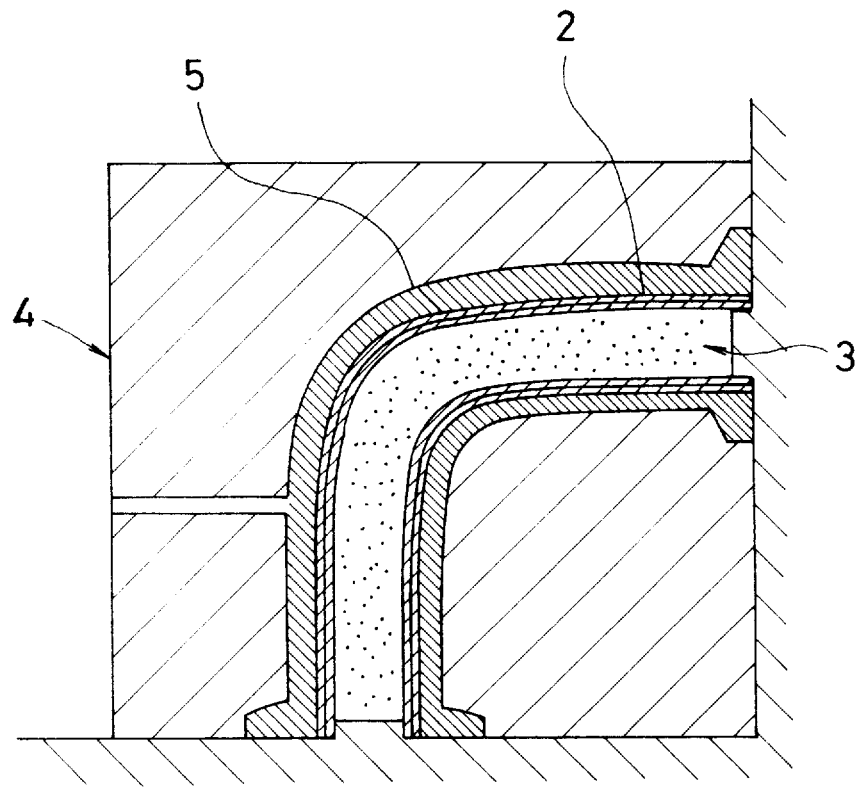
FIG. 1 is a sectional view of a mold for use in injection molding the hollow plastic member of the present invention.

In FIG. 1, there is shown a cross section view of a mold 4, and an elbow shaped inner hollow core member 2 filled with particles of sand or other particulate material 3. The inner hollow core member 2 can be made by blow molding techniques known in the art. This hollow member 2 is a relatively thin walled member as shown in FIG. 1 and serves as the inner hollow core member for the injection molding step. The inner hollow core member need not be filled with anything at the time of the second step in the process of injection molding. An outer plastic hollow member 5 is formed by injecting a resin between the mold 4 and the inner hollow member 2 by an injection molding machine (not shown) according to injection molding techniques known in the art.

Figure 2:
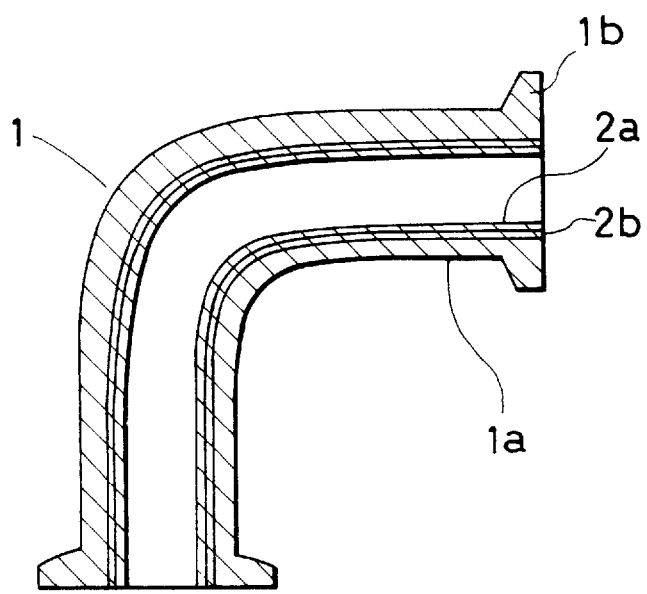
FIG. 2 is a sectional view of the hollow plastic member of the present invention.

In FIG. 2, there is shown in cross section, the final product; i.e., a hollow plastic tube 1 suitable for use as an air intake passageway of an automotive engine. It is integrally formed from the inner hollow core member 2 including an inside layer 2a and intermediate layer 2b, and an outside layer 1a with a flange 1b being unitary with the outside layer 1a and located at each end of the outside layer, respectively.

The inside layer 2a is very smooth relative to the outside layer 1a and has a low coefficient of friction such that air passing through the passageway experiences little if any friction. The inside core member formed of the composite of layers 2a and 2b extends flush out to the end of the flange 1b formed in the outer layer 1a.

Figure 3:
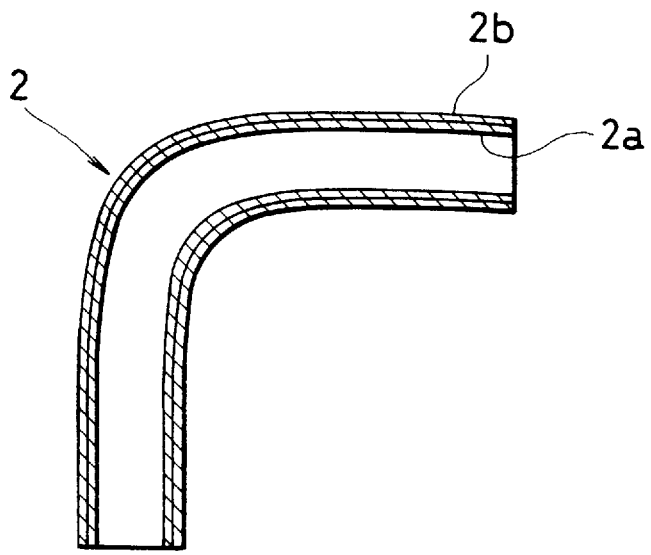
FIG. 3 is a sectional view of an inner hollow member.
Figure 4:
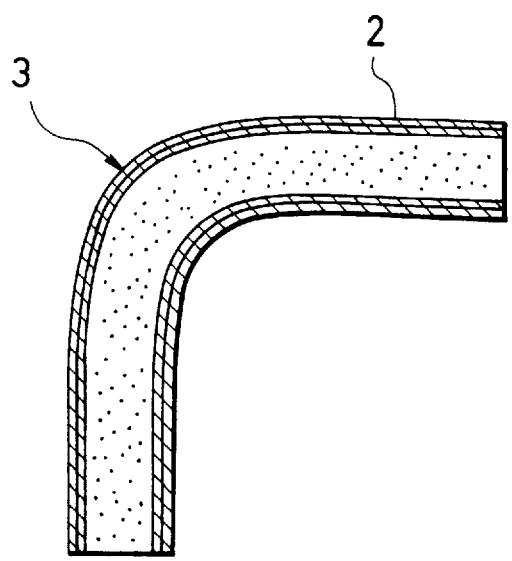
FIG. 4 is a sectional view of a core filling particles of sand like material in the inner hollow member.

In FIG. 3, there is shown a cross section view of the elbow shaped inside hollow tube member 2 formed of a two-layer composite construction, the outside layer 2b of which is formed of glass fiber reinforced nylon resin wherein the amount of glass fiber present is, for example, 30% by weight based on the total weight of the nylon and the inside layer 2a is non-reinforced resin. The inside layer 2a is formed of a suitable resin such as nylon sold as Nylon 10, Nylon 11 or Nylon 610 of the Toray Company (Rilsan) or polyethylene or polyphenylene sulfide. The outer layer 1a, 1b is also made of a suitable resin such as Nylon 6 or Nylon 66 made by Toray under the mark AMILAN®, or NOVAMID® by Mitsubishi Engineering Plastics Co. This can be integrally formed by conventional blow molding techniques in the first step of the process. The amount of glass fiber reinforcement can range from about 20 to 40%, preferably 30% by weight. Any suitable glass fiber which is commercially available can be used for purposes of this invention.

The core 2 is integrally formed of the inner layer 2a and outer layer 2b by blow molding and is inserted into the mold 4 and is then ready as shown in FIG. 1 for injection molding. Thereafter the hollow plastic tube 1 is integrally formed with the core 2 by injecting a glass fiber reinforced plastic resin, wherein the amount of glass fiber present ranges from 35% to 55% by weight, preferably 45% by weight based on the weight of the resin, between the core 2 and the mold 4 according to injection molding techniques.

As shown in FIG. 1, in the present invention, the hollow plastic member 1 is formed to be integral with the inner core by injecting, for example, a 45% glass fiber reinforced nylon resin for providing the outer layer 5 around the inside hollow tube 2 as the core including the inner layer 2a of non-reinforced resin and the outer layer 2b of 30% glass fiber reinforced resin. It is preferred that layer 1a, 1b contain a higher weight percentage of glass fiber reinforcement than layer 2b.

Therefore, by using the glass fiber reinforced nylon resin for the outer member 5 and integrally forming a three layer structure, the hollow member of this invention is obtained with high gas-barrier properties which is highly proof against leakage by gases or liquids.

Further, by forming the inner layer 2a from a non-reinforced nylon or polyethylene resin, there is obtained a high smoothness for the inner surface 2a which reduces drag, so that it can be used for the intake passage of the automotive engine. High smoothness can be judged by hand rubbing the inside of the surface 2a and then hand rubbing the outside surface 1a. The absence of a feel of roughness on surface 2a as a result of this comparison by hand means that the air/fuel mixture will flow through the member without any measurable friction.

In an another embodiment of the present invention, the inner layer 2a is formed of polyphenylene sulfide (PPS) resin layer with low water absorption and high rigidity, so that it is possible to use it in the cooling passage of the engine.

Therefore, in accordance with the present invention it is possible to select suitable plastic resins according to the gases or liquids passing through the hollow plastic member by using the two step molding process of blow molding and injection molding.

While the presently preferred embodiment of the present invention has been shown and described, it is to be understood that these disclosures are for the purpose of illustration and various changes and modification may be made without departing from the scope of the invention as set forth in the appended claims.

I claim:

1. A hollow plastic member for guiding a flow of fluid, comprising:

an inner hollow member integrally formed from an inner layer of non-reinforced resin and an intermediate layer made from glass fiber reinforced resin; and an outer hollow member made from glass fiber reinforced nylon resin integrally formed with said inner hollow member by injection molding.

2. The hollow plastic member according to claim 1, wherein said inner layer is polyethylene resin;

said intermediate layer is made from 20 to 40% by weight glass fiber reinforced nylon resin; and said outer hollow member is made from 35–55% by weight glass fiber reinforced nylon.

3. The hollow plastic member according to claim 1 wherein said inner layer is polyphenylene sulfide resin.

4. The hollow plastic member according to claim 1 wherein said intermediate layer is made from 30% by weight glass fiber resin forced nylon resin; and said outer hollow member is made from 45% by weight glass fiber resin forced nylon.

* * * * *